May 3, 1938.  W. A. VAN BERKEL  2,116,085
VACUUM CLEANING APPARATUS
Filed Oct. 20, 1936
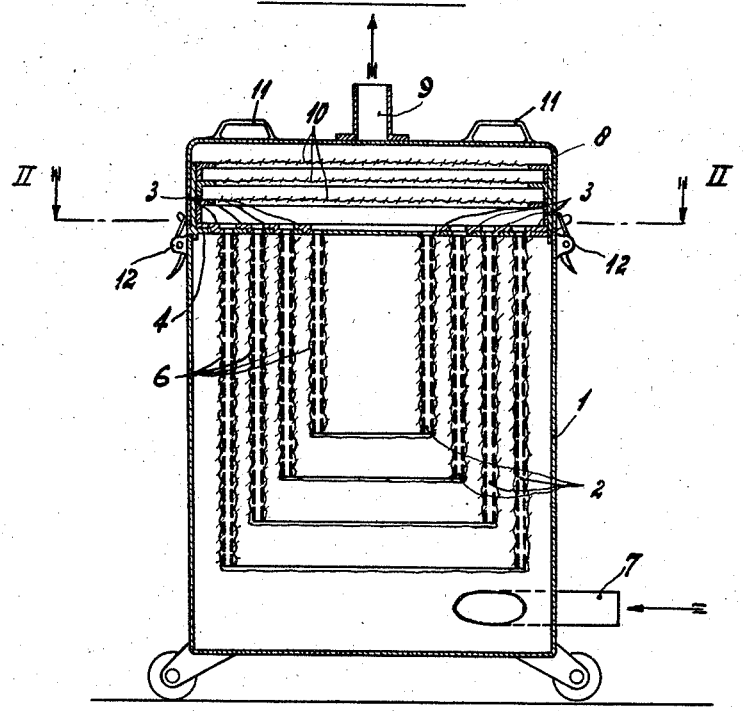
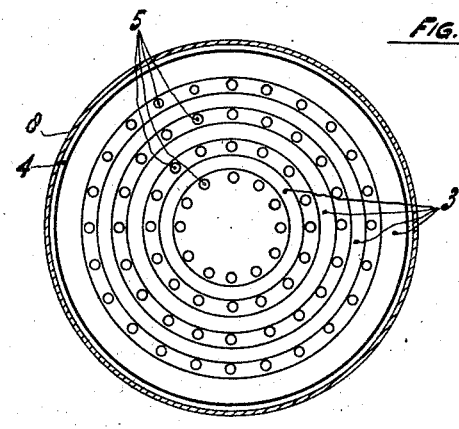
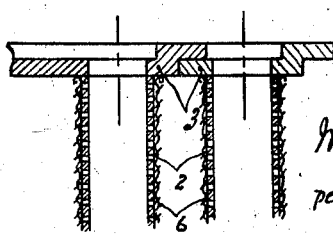
Wilhelmus Adrianus van Berkel INVENTOR.
per ATTORNEY.

Patented May 3, 1938

2,116,085

UNITED STATES PATENT OFFICE 2,116,085

VACUUM CLEANING-APPARATUS

Wilhelmus Adrianus van Berkel, Brussels, Belgium, assignor to Maatschappij van Berkel's Patent N. V., Rotterdam, Netherlands, a company of the Netherlands Application October 20, 1936, Serial No. 106,519
In Great Britain November 5, 1935

8 Claims. (Cl. 183—70)

This invention relates to a dust-separator for vacuum cleaning-apparatus in which dust and other matter entrained with the air passing through the apparatus is filtered from the air.

An object of the invention is to provide the dust-separator with a large filtration surface, thereby minimizing the disadvantage that in known vacuum cleaning-apparatus the filtration surface is comparatively small and that accordingly the filtering medium becomes choked with dust undesirably soon.

Another object of the invention is so to distribute the filtration surface that said surface is greatest where the dust, with which the air is laden, is densest. That is to say, where the invention is applied to a dust-separator adapted for so-called cyclone separation, the filtration surface will be greatest towards the outer limit of the cyclone separation zone.

Another object of the invention is to provide an assembly of separate removable compartments having perforate double walls covered by filtering material.

Other objects of the invention will be apparent from the following specification and claims.

An example embodying the invention will now be described with reference to the accompanying drawing, in which:—

Fig. 1 is a vertical central section of a vacuum-cleaner dust-separator.

Fig. 2 is a section approximately on the line II—II of Fig. 1.

Fig. 3 is a detail view showing a fragment of Fig. 1 to an enlarged scale.

The dust-separator shown comprises a circular housing 1 containing an assembly of four coaxial double-walled annular compartments, whose double-walls 2 depend from oper-frame-like supports constituted by concentrically arranged rings 3, to which the walls 2 are attached, for example by soldering. The walls 2 are composed of perforate material; for example, sheet metal, or other material, finely perforated with holes, or open-mesh wire-gauze. The rings 3 respectively overlap and seat upon one another, the outermost ring resting upon an open-framelike support-ring 4 secured to the housing wall. Each of these rings 3 is formed with a circular series of air outlet-apertures 5 opening into the respective compartments below. A double-walled bag 6 of stiff air-filtering fabric is drawn from the bottom over the double-walls of each compartment.

The housing 1 has a tangential air inlet 7 below the level to which the double-walled compartments extend. The housing is surmounted by a top casing 8 which is in communication through an air outlet 9 with the suction-generator (not shown) of the apparatus.

The arrangement is such that, on exposing the top of the dust-separator housing 1 by removing the top casing 8 the double-walled compartments 2 and their top-rings 3 can be removed by lifting them out of the assembly, after which the filter bags 6 can be removed, cleaned of dust etc. and replaced, or new filter bags can be fitted.

In view of the fact that the filtration surface is comparatively large, cleaning need be effected only after correspondingly long use of the apparatus.

The top-casing 8 may as shown enclose a chamber wherein one or more additional removable filters 10 are mounted. This top-casing may have one or more handles 11 whereby the entire dust-separator can be lifted. The means whereby the top casing is attached to the dust-separator housing may comprise readily detachable catches 12. The housing may have a wheeled base.

If desired, the suction generator may consist of a double-piston-and-cylinder pump unit, an example of such a unit being described in my concurrent United States patent application Serial No. 59,931, filed January 20, 1936.

In the operation of the apparatus, dust-laden air is sucked in through the tangential inlet, a cyclone being produced in the circular interior of the housing 1. The air rises through the material of the bags 6 and the double-walls 2 into the compartments defined thereby. Much of the dust will be filtered from the air by said material. The filtered air rises through the outlets 5 into the casing 8 and is there finally purified by the filters 10. The purified air is sucked through the outlet 9 by the suction-generator and discharged.

The cyclone action produced in the dust-laden air admitted through the inlet 7 results in the air being most densely impregnated towards the circular wall of the housing 1 and being almost free from dust at the central axis of the housing. Thus, the filtration surface presented by the bags 6 is so distributed that the greatest area deals with the air bearing most dust. The requisite progressive increase in filtration surface presented by the bags 6 is obtained not only by virtue of an outer bag being necessarily of greater circumferential size but also by making the bags axially longer in proportion to their radial size.

It will be seen that the several bags 6 providing the primary stage of filtration are arranged "in parallel"; that is, each air particle filtered passes through only one bag 6. On the other hand, the filters 10 providing the secondary stage of filtration are arranged "in series"; that is, each air particle filtered passes through all the filters 10.

I claim:—

1. A vacuum-cleaner dust-separator comprising a housing, framelike members seated on one another and within the housing, double-walled compartments arranged within said housing and attached to said framelike members the walls of said compartments being perforate, air-filtering material covering the individual compartments, air inlet means on said housing and air outlet means in said framelike members.

2. A vacuum-cleaner dust-separator comprising a housing with a circular interior, air inlet means on the housing arranged tangentially to admit dust-laden air as a cyclone into said circular interior, framelike members seated on one another and within the housing, double-walled compartments arranged within said housing and attached to said framelike members, the walls of said compartments being perforate, double-walled annular air-filters covering the individual compartments, and air outlet means in said framelike members.

3. A vacuum-cleaner dust-separator comprising a housing, an open support mounted in said housing, a plurality of rings overlapping and seating on one another and on said support, air-passages formed in the respective rings, annular double-walls dependently secured to the respective rings, each double wall defining a compartment and being composed of perforate material, double-walled bags of air-filtering material covering the respective double-walls, and air inlet and outlet means on said housing.

4. A vacuum-cleaner dust-separator comprising a housing, with a circular interior, an open support mounted in said housing, a plurality of rings overlapping and seating on one another and on said support, air-passages formed in the respective rings, annular double-walls dependently secured to the respective rings, each double wall defining a compartment and being composed of perforate material, double-walled bags of air-filtering material covering the respective double-walls, the compartments and the bags being axially longer in proportion to their radial size, and air inlet and outlet means on said housing, said inlet means opening tangentially into the circular interior thereof.

5. A vacuum-cleaner dust-separator comprising a housing structure, a framelike support mounted in said structure, a plurality of rings overlapping and seating on one another, double-walled compartments arranged within said structure, the walls of said compartments being perforate and being attached to said rings, primary stage filter means constituted by filtering material covering the individual compartments, secondary stage filter means also within the housing structure, an air inlet and air outlet on said structure and air outlets in said rings for transferring air between the primary and secondary filtration stages.

6. For a vacuum-cleaner filter, an assembly of double-walls made of perforate material, framelike supports overlapping and seating on one another, said double-walls being secured to said supports respectively, and air passages through said supports, said passages opening into air compartments defined by the respective double-walls.

7. For a vacuum-cleaner filter, an assembly of annular coaxial double-walls made of perforate material, concentric rings overlapping and seating on one another, said double-walls being secured to said rings respectively, and passages through said rings, said passages opening into annular air-receiving compartments defined by the respective double-walls.

8. A vacuum-cleaner dust-separator comprising a housing, an open support mounted in said housing a plurality of rings overlapping and seating on one another and on said support, air-passages formed in the respective rings, annular double-walls dependently secured to the respective rings, each double wall defining a compartment and being composed of perforate material, the respective compartments being adapted to be covered by removable double-walled bags of air-filtering material, and air inlet and outlet means on said housing.

WILHELMUS ADRIANUS van BERKEL.